United States Patent Office 3,451,560
Patented June 24, 1969

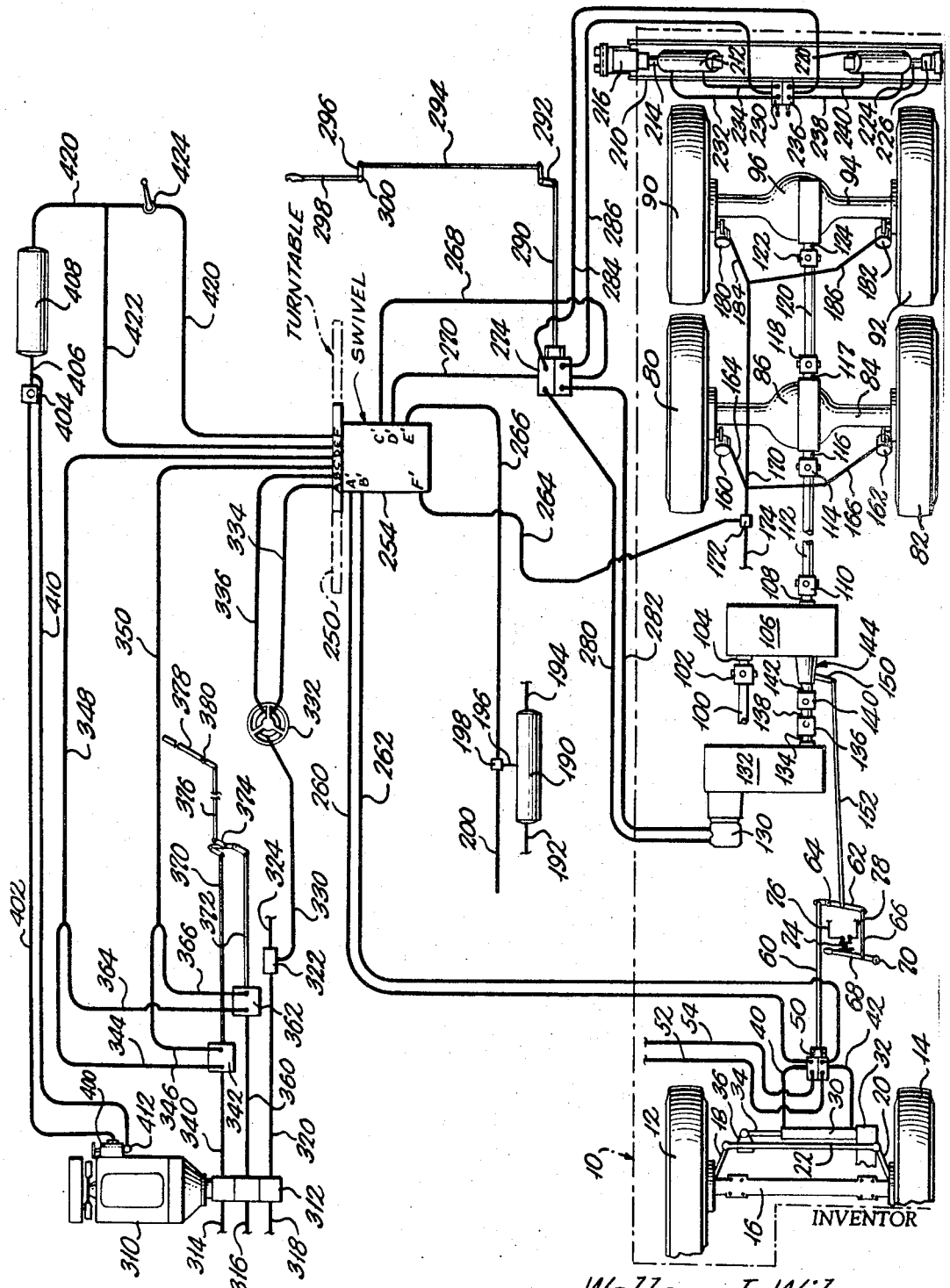

3,451,560
REMOTE CONTROL SYSTEM
Wallace J. Witwer, Waukesha, Wis., assignor to Hein-Werner Corporation, Waukesha, Wis., a corporation of Wisconsin
Filed July 20, 1967, Ser. No. 654,862
Int. Cl. B66c 23/36
U.S. Cl. 212—38                    9 Claims

ABSTRACT OF THE DISCLOSURE

A self-propelled vehicle for a power-operated crane or the like includes dirigible wheels and drive wheels. Power-operated steering means is provided for the dirigible wheels and the usual drive means and brake means are provided for the drive wheels. These mechanisms are all operated in the usual manner with conventional controls on the vehicle. Power-operated outrigger means is also provided having control means on the vehicle. An auxiliary remote control system is provided at an operator's station mounted on a turntable on the vehicle. A source of hydraulic pressure and air pressure is mounted on the upper works on the turntable, the source of hydraulic pressure being operatively connected with the hydraulic motor mounted on the vehicle and connected through a clutch means with the drive wheels of the vehicle. Valve means is provided for controlling the direction of hydraulic flow to the motor so as to operate the vehicle in either forward or reverse. This same source of hydraulic pressure may be selectively connected with the outrigger means to operate the outrigger means in either direction of movement. Valve means is provided for alternatively connecting the hydraulic motor or the outrigger means to the source of hydraulic pressure. The source of hydraulic pressue is also connected with a powe steering control means which is adapted to be connected with the power-operated steering means of the vehicle. A control level selectively operates the clutch means to connect the hydraulic motor to the drive wheels or to disconnect it therefrom. This lever also serves to control a switch means for preventing the engine of the vehicle from starting when the lever is in remote control position. This lever also disconnects the conventional steering control means and connects the remote control system power steering control means when in remote control position. The remote control system also includes an auxiliary air reservoir which is connected with the conventional air reservoir of the vehicle to release the fail-safe parking brakes of conventional construction. The air reservoir of the auxiliary remote control system is also connected with the tandem brakes associated with the drive wheels and valve means is provided for controlling the operation of the tandem brakes from the remote control system.

Background of the invention

The present invention relates to a new and novel remote control system for use with self-propelled vehicle mounted power-operated machinery such as cranes, excavators, power shovels and the like wherein the machinery is adapted to be mounted on a rotatable turntable. A driving cab is provided for driving the vehicle in the usual manner, and a separate operating cab is provided for operating the power-operated machinery. In these applications, it is desired to remotely control the operation of the vehicle from the operating cab.

Remote control systems for this type of power-operated machinery mounted on self-propelled vehicles have presented a number of serious problems. In many instances, it is necessary that the main propulsion engine of the vehicle continues to operate in order to move the vehicle under remote control.

In other instances, mechanical drive connections have been provided from the auxiliary engine on the vehicle to the driving wheels of the vehicle. A typical example of this arrangement is shown in U.S. Patent No. 2,728,463 wherein a relatively complicated mechanical drive connection is provided from the auxiliary engine in the upper works of the vehicle mounted on the turntable thereof to the drive wheels of the vehicle.

Additionally, such remote control systems in the prior art have not always provided sufficient means for completely controlling the operation of the vehicle from the operating cab thereof. It is desirable to enable the operator to cause the vehicle to move in either forward or reverse while steering the vehicle, and in addition it is desirable to enable operation of the outrigger means on the vehicle for properly positioning it while under complete control of the remote conrtol system.

Summary of the invention

The problems encountered with the prior art arrangements as discussed hereinabove have been substantially eliminated with the arrangement of the present invention. The engine of the vehicle in the present arrangement may be shut off, and the vehicle may be completely operated from the engine of the auxiliary remote control system. This engine drives a pump which produces hydraulic pressure, and this hydraulic pressure is employed for driving the vehicle as well as for controlling the operation of the power steering means thereof and the outrigger means thereof. The engine is further connected with an air compressor for providing all of the necessary air pressure for operating the brake system of the vehicle.

Since all of the connections from the remote control system to the vehicle are either hydraulic or pneumatic, no mechanical drive connections are necessary and the system is accordingly greatly simplified by eliminating the necessity of providing complex mechanical drive connections between the remote control system and the vehicle.

A further advantage of the present invention is the fact that the remote control system is adapted to completely control the operation of the vehicle including the driving thereof in forward or reverse, the steering thereof and the operation of the outrigger means, while also enabling the brake system of the vehicle to be effectively operated.

An object of the present invention is to provide a new and novel remote control system for a self-propelled vehicle having power-operated machinery thereof wherein the vehicle can be completely controlled while the main propulsion engine is turned off and wherein no mechanical drive connections are required between the engine of the remote control system and the drive wheels of the vehicle.

Brief description of the drawing

The drawing represents a somewhat schematic illustration of a self-propelled vehicle for supporting the power-operated machinery according to the present invention and including a remote control system for operating the vehicle.

Description of the preferred embodiment

Referring now to the drawing, a self-propelled vehicle in the form of a carrier or truck for suitable power-operated machinery such as a crane, excavator or power shovel is indicated schematically by dotted line 10 and represents a conventional vehicle of this type such as shown for example in the aforementioned U.S. patent. The vehicle construction is conventional and has not been illustrated in detail for the sake of clarity in understanding the present invention.

The vehicle includes a pair of front dirigible wheels 12 and 14 which are swingably mounted adjacent the outer ends of the front axle 16. Steering arms 18 and 20 are interconnected by a tie rod 22 in the usual manner, and in accordance with modern vehicles a power steering arrangement is provided. The power actuating means for controlling the steering of the dirigible wheels takes the form of a hydraulically operated cylinder 30 supported by a frame member 32 of the vehicle. A piston rod 34 extends outwardly of cylinder 30 and is connected by means of a clamp member 36 with the tie rod 22.

A pair of conduits 40 and 42 are connected to opposite ends of the hydraulic cylinder 30, conduits 40 and 42 also being connected with a diversion valve 50 which is adapted to be operated so as to interconnect the power cylinder 30 with either the power steering system of a conventional nature mounted on the vehicle or with the power steering system of the remote control system hereinafter described.

A pair of conduits 52 and 54 are interconnected with the conventional power steering system of the vehicle and are operated by the steering wheel in the driving cab of the vehicle in the usual manner.

An operating arm 60 is connected with valve 50 for controlling the operation thereof, the outer end of arm 60 being pivotally interconnected with the upper end of a member 62 which is pivotally mounted about a pivot axis indicated by reference numeral 64. The lower end of member 62 is pivotally interconnected with an arm 66 which in turn is pivotally interconnected with an operating lever 68 the lower end of which is mounted for pivotal movement about a pivot axis indicated by reference numeral 70.

A switch member 74 is connected to lever 68 and is adapted to move therewith upon actuation of the lever 68. In the position illustrated in the drawing, lever 68 is swung to the right into a position wherein the apparatus is not controlled by the remote control system. When the lever is so oriented, switch member 74 engages contacts connected with leads 76 and 78 to provide an electrical connection between these leads. These leads are connected in the ignition system of the vehicle so that the circuit must be closed between leads 76 and 78 in order to energize the engine of the vehicle. Accordingly, when lever 68 is swung to the left so as to open the circuit between leads 76 and 78, the ignition system in the vehicle is no longer operative, and it is impossible to operate the vehicle engine when the apparatus is in position for remote control.

The vehicle also includes a first pair of drive wheels 80 and 82 supported at opposite ends of an axle 84 having a differential mechanism 86 supported at the central portion thereof. A similar pair of drive wheels 90 and 92 are mounted at opposite ends of an axle 94 having a differential mechanism 96 supported at the central portion thereof.

A conventional drive shaft 100 is of course connected at the forward end thereof to the main propulsion engine (not shown) of the vehicle in the usual manner. This drive shaft is connected through a universal joint 102 with an input shaft 104 of a transfer case or gear box 106.

The output shaft 108 of the transfer case is connected through a universal joint 110 with a shaft 112. Shaft 110 is in turn connected through a universal joint 114 with a shaft 116 connected with the differential mechanism 86. Shaft portion 117 drivingly connected with shaft 116 is connected through a universal joint 118 with a shaft 120. Shaft 120 is in turn connected through a universal joint 122 with a shaft 124 which is drivingly connected with the differential mechanism 96.

A hydraulic motor 130 is drivingly connected with a drop-box transmission 132. The output shaft 134 of transmission 132 is connected to a universal joint 136 with a shaft 138. Shaft 138 is in turn connected through a universal joint 140 with a shaft 142. Shaft 142 is in turn connected through a selectively operable clutch means 144 with the transfer case 106.

An operating arm 150 for the clutch 144 is pivotally connected with an elongated member 152 which is in turn pivotally interconnected with an intermediate portion of member 62. Accordingly, when lever 68 is in the position illustrated, the clutch 144 will be in a position so as to disconnect the hydraulic motor and drop-box transmission from the transfer case 106. On the other hand, when the lever 68 is swung to the left from the position shown in full lines in the drawing, the clutch 144 will be engaged so that the hydraulic motor will be drivingly connected with the transfer case.

Pneumatic cylinders 160 and 162 are provided for operating the service tandem brakes associated with the driving wheels 80 and 82 respectively. Cylinders 160 and 162 are connected by conduits 164 and 166 with a common conduit 170. Conduit 170 is connected through a shuttle valve 172 with a conduit 174 which in turn is connected in the brake system so as to be operated by the brake treadle mounted in the driving cab in the usual manner.

Pneumatic cylinders 180 and 182 are interconnected with the service tandem brakes associated with driving wheels 90 and 92. Cylinders 180 and 182 are connected by conduits 184 and 186 respectively with the aforementioned conduit 170 whereby the service brakes may be simultaneously applied upon operation of the brake treadle.

A main air reservoir is supported on the vehicle and is adapted to contain air under pressure therewithin for operating the brake system of the vehicle. Conduits 192 and 194 are connected into the brake system of the vehicle in the usual manner, and as is well understood, as long as air pressure exists in this reservoir, the conventional fail-safe parking brakes of the vehicle will be released, and furthermore, air pressure is available for operating the service brakes.

A suitable supporting beam or the like 210 is mounted at the rear end of the vehicle and supports a first hydraulic cylinder 212 having a piston rod 214 extending therefrom and being operatively connected with an outrigger or jack member 216. A similar hydraulic cylinder 220 is supported on member 210, a piston rod 224 extending from cylinder 220 and being connected with an outrigger or jack member 226. These outriggers are utilized for engaging the ground and stabilizing the vehicle when it is in operative position in a well known manner.

A first control valve 230 is operatively connected with a pair of conduits 232 and 234 which in turn are operatively connected with opposite ends of the hydraulic cylinder 222. Valve 230 may be manually operated to selectively operate outrigger 216. A similar control valve 236 is connected with conduits 238 and 240 which are operatively connected with opposite ends of the hydraulic cylinder 220. Manual operation of valve 236 is adapted to selectively control the operation of outrigger 226.

A conventional turntable 250 is indicated schematically by reference numeral 250, this turntable being swivelly mounted on the vehicle and generally over the rear driving wheels in the usual manner. It will be understood that any suitable power-operated machinery such as a crane, power shovel, excavator or the like may be mounted on the turntable as well as an operating cab within which the operator is positioned when the apparatus has been moved to a job site and is positioned for control by the remote control system of the present invention.

A swivel means 254 is supported at the central portion of the turntable, and this swivel means may be of a known construction such as the mechanism sold under the name of Hydraswivel, manufactured by Hein-Werner Corporation of Waukesha, Wisconsin. This swivel means is such as to permit ready rotation of the turntable while transferring hydraulic and pneumatic pressure through the swivel means through suitable bores and porting therewithin. This type of swivel means is provided for the specific purpose of enabling hydraulic and pneumatic communication between the so-called upper works mounted above the turntable and the so-called lower works mounted below the turntable of this type of mechanism.

The upper portion of the swivel means is provided with ports identified by reference characters A, B, C, D, E and F, having conduits connected therewith as hereinafter described. The ports at the upper portion of the swivel means are suitably interconnected with ports identified by similar reference characters primed. In other words, port A is connected with port A', port B is connected with port B' etc.

The ports A' and B' of the swivel means are connected with conduits 260 and 262 which in turn are connected with the diversion valve 50 previously mentioned.

The port F' of the swivel means is connected by means of conduit 264 with the shuttle valve 172 of the brake system previously described.

The port E' of the swivel means is connected by conduit 266 with the shuttle valve 198 previously described which in turn is operatively connected with the main air reservoir 190.

Ports C' and D' are connected by conduits 268 and 270 respectively with opposite sides of a diversion valve means 274.

Diversion valve means 274 is connected with a pair of conduits 280 and 282 which in turfn are connected to the hydraulic motor 130 previously described. Diversion valve means 274 is also operatively connected with a pair of conduits 284 and 286 which are connected with opposite sides of the control valves 230 and 236 of the outrigger means.

The diversion valve means 274 is operated by an elongated member 290 which is pivotally interconnected with a bell crank 292 which is further pivotally interconnected with an elongated shaft 294 which is adapted to extend through the center of the swivel means 254. The upper end of the shaft 294 is connected with an arm 296 extending normally from the lower end of a lever 298 pivotally mounted about a pivot axis indicated by reference numeral 300.

With this arrangement, the diversion valve means 274 is mounted in the lower works beneath the turntable, while the operating lever 298 is mounted above the turntable and may be disposed within the operating cab so that the operator is adapted to remotely control the operation of diversion valve means 274. It should also be understood that the interconnection between lever 298 and diversion valve means 274 need not necessarily be a mechanical one, and that diversion valve means 274 could be remotely controlled through the intermediary of a hydraulic or pneumatic line the pressure of which would be suitably transferred through the swivel means 254.

The upper works includes an auxiliary engine 310 mounted on the turntable and adapted to be operated independently of the main compulsion engine of the vehicle.

Engine 310 is adapted to operate a hydraulic pump 312 which is connected by means of conduits 314, 316 and 318 with a suitable oil reservoir.

A conduit 320 connects the pump 312 with a flow divider 322. The outlet of the flow divider is connected with a first conduit 324 which in turn is operatively connected with the swing valve which controls turning of the turntable. The control for this swing valve is usually mounted in the operating cab of the apparatus.

The outlet of the flow divider 322 is also connected through a conduit 330 with the remote power steering control means 332. Means 332 may comprise a conventional steering wheel structure having suitable valve means associated therewith in a conventional manner for controlling hydraulic flow through conduits 334 and 336 so as to properly operate the power steering cylinder previously described. These conduits 334 and 336 are connected with ports A and B respectively of the swivel means which in turn are connected with ports A' and B' which are further connected with the power steering system as previously described.

The pump is connected by a conduit 340 with a diversion valve 342. A pair of outlet conduits 344 and 346 extend from the diversion valve and are connected with conduits 348 and 350 which in turn are respectively connected with supports D and C of the swivel means previously described.

The pump is also connected by a conduit 360 with a diversion valve means 362. Two outlet conduits 364 and 366 extend from diversion valve means 362 and are connected with the conduits 348 and 350 previously described.

Diversion valve means 342 and 362 are operated respectively by elongated members 370 and 372 which are interconnected with a common member 374. Member 374 is pivotally interconnected with an elongated member 376 which is in turn pivotally connected with the lower end of a control lever 378 mounted for pivotal movement about a pivot axis indicated by reference numeral 380.

Control lever 378 is adapted to control the direction of hydraulic flow to the ports C and D of the swivel means, these ports in turn being connected with the ports C' and D' which may be selectively connected with the hydraulic motor or the outrigger means whereby the direction of drive of the hydraulic motor, or the direction of movement of the outrigger means may be selectively controlled as hereinafter more fully described.

An air compressor 400 is driven by the engine 310 and is connected with a conduit 402. Conduit 402 is connected through a one-way check valve with a conduit 406 which in turn is connected with an auxiliary air reservoir 408. Conduit 406 is also connected through a conduit 410 with a governor valve mechanism 412 so that the pressure within air reservoir 408 will not exceed a predetermined safe value.

The auxiliary air reservoir 408 is connected by a conduit 420 with the port F of the swivel means. A further conduit 422 is connected between conduit 420 and the port E of the swivel means. A manually operable valve 424 is connected in conduit 420 for controlling in a selective manner the flow of air under pressure to the port F of the swivel means.

It should be understood that in addition to the conventional controls disposed within the operating cab of the vehicle including the means for starting and stopping as well as throttling the auxiliary engine, the control members 298, 332, 378 and 424 will each be operatively disposed within the operating cab so that the apparatus may be completely remotely controlled from such operating cab.

Considering now the operation of the apparatus, let us first assume that the lever 68 is in the operative position illustrated in the drawing, and that the vehicle is operated in the usual manner wherein the steering, brake, and driving controls of the vehicle are all manipulated from the driving cab of the vehicle. The lever 68 may be disposed within the cab of the vehicle or adjacent thereto.

If the operator should then desire to switch to remote control, he will operate lever 68 to the left so as to move switch member 74 away from the contacts associated with leads 76 and 78 so that the main compulsion engine of the vehicle will be rendered inoperative.

The operator can then take his place in the operating cab on the upper works, and the auxiliary engine 310 is started and adjusted to the desired speed. This will of course energize the pump 312 as well as the compressor 400.

Compressor 400 will build up air pressure in auxiliary air reservoir 408. This auxiliary air reservoir is in turn connected through conduits 420 and 422 with the port E. This port is in turn connected through the swivel means with the port E' which is further connected through conduit 266 and shuttle valve 198 with the main air reservoir 190 so as to maintain air pressure in the brake system. This will ensure that the fail-safe parking brakes are released and that the service tandem brakes may be operated.

The service tandem brakes may be selectively controlled by valve 424 which is connected in the conduit 420 so as to control the flow of air pressure to port F. Port F is in turn connected with port F' which is further connected through conduit 264 and shuttle valve 172 with the service tandem brakes.

When lever 68 is shifted to the left as aforedescribed to place the system in condition for remote operation, diversion valve means 50 is operated so as to enable the power steering control means 332 to control the flow of hydraulic pressure through ports A and B and thence through ports A' and B' to the diversion valve 50 and thence through conduits 40 and 42 to the power-operating cylinder 30 of the steering mechanism. Accordingly, operation of the steering control means 332 will serve to remotely control the movement of the dirigible wheels 12 and 14 of the vehicle.

When the lever 68 is moved to the remote control position, it will also operate clutch 144 so as to operatively connect hydraulic motor 130 with the transfer case 106 and thereby provide a driving connection with the drive wheels of the vehicle. The main transmission of the vehicle connected between the drive engine of the vehicle and the transfer case will be placed in neutral.

Control lever 378 is adapted to control the direction of fluid flow through the ports C and D and thence through the ports C' and D' of the swivel means. Accordingly, the direction of hydraulic flow through conduits 268 and 270 to the diversion valve means 274 may be selectively controlled.

The diversion valve means 274 may in turn be controlled by lever 298 to determine whether the hydraulic pressure is transmitted to the hydraulic motor or to the outrigger means. Accordingly, either the hydraulic motor or the outrigger means may be alternatively operated in accordance with the position of lever 298, and the direction of operation may be controlled in accordance with the position of control lever 378.

It is apparent that with the arrangement of the present invention, the vehicle may be selectively driven forward or in reverse through the intermediary of the hydraulic motor which is driven by hydraulic pressure provided by the pump means mounted on the upper works and driven by the auxiliary motor 310. Additionally, the dirigible wheels may be remotely steered through the intermediary of the hydraulic connections provided. The service tandem brakes may also be selectively remotely operated, and additionally the outrigger means may be remotely controlled from the operating cab.

It is apparent from the foregoing that there is provided according to the present invention a new and novel remote control system for use with a self-propelled vehicle having power-operated machinery supported thereon and wherein the main propulsion engine of the vehicle remains inoperative at all times during such remote control. The vehicle may be substantially completely controlled from a remote location, and it is not necessary to provide any mechanical driving connections between the auxiliary engine mounted on the upper works and the drive wheels of the vehicle, the drive being transmitted through the intermediary of the hydraulic system in the present invention.

While, in illustrating the present invention, reference has been made to the use of air pressure for operating the brake system, it will be understood that hydraulic pressure may also be used without departing from the present invention.

As this invention may be embodied in several forms without departing from the spirit or essential characteristics thereof, the present embodiment is therefore illustrative and not restrictive.

I claim

1. In combination, a vehicle for supporting power-operated machinery, said vehicle including dirigible wheels, steering means on the vehicle for steering said dirigible wheels, said vehicle also including drive wheels, drive means on the vehicle for driving said drive wheels, tandem brake means operatively connected with said drive wheels, pneumatic power means for operating said tandem brake means, first air reservoir means on the vehicle connected with said pneumatic power means, said remote control means including a second separate air reservoir means operatively connected with said pneumatic power means, and valve means connected between said second air reservoir means and said pneumatic power means for remotely controlling the operation of said pneumatic power means and said brake means, means on the vehicle for operating said brake means, said vehicle including outrigger means, control means on the vehicle for said outrigger means, and a remote control system on the vehicle and including a source of hydraulic pressure, a hydraulic motor on said vehicle, means providing communication between said source of hydraulic pressure and said hydraulic motor, and means for selectively operably connecting and disconnecting said hydraulic motor with respect to said drive wheels.

2. Apparatus as defined in claim 1 including selectively operable valve means for controlling the direction of flow of hydraulic pressure to said hydraulic motor so as to enable operation of the vehicle in either forward or reverse directions.

3. Apparatus as defined in claim 1 wherein said steering means is power-operated, said remote control system including valve means for controlling the operation of the power steering means.

4. Apparatus as defined in claim 1 wherein said remote control system includes air compressor means connected to second reservoir means, said second air reservoir means being connected with said first-mentioned air reservoir means to maintain air pressure in said first-mentioned air reservoir means when the apparatus is being operated by the remote control system.

5. In combination, a vehicle for supporting power-operated machinery, said vehicle including dirigible wheels, steering means on the vehicle for steering said dirigible wheels, said vehicle also including drive wheels, drive means on the vehicle for driving said drive wheels, brake means for said drive wheels, means on the vehicle for operating said brake means, said vehicle including outrigger means, control means on the vehicle for said outrigger means, and a remote control system on the vehicle and including a source of hydraulic pressure, a hydraulic motor on said vehicle, means providing communication between said source of hydraulic pressure and said hydraulic motor, and means for selectively operably connecting and disconnecting said hydraulic motor with respect to said drive wheels, said selectively operable means comprising clutch means, an operating member for controlling the operation of said clutch means, and electrical switch means operatively connected with said member and actuated thereby to prevent starting of the engine of the vehicle when said member is in remote control position and said clutch means is engaged.

6. In combination, a vehicle for supporting power-operated machinery, said vehicle including dirigible wheels, steering means on the vehicle for steering said dirigible wheels, said vehicle also including drive wheels, drive means on the vehicle for driving said drive wheels, brake means for said drive wheels, means on the vehicle for operating said brake means, said vehicle including outrigger means, control means on the vehicle for said outrigger means, and a remote control system on the vehicle and including a source of hydraulic pressure, a hydraulic motor on said vehicle, means providing communication between said source of hydraulic pressure and said hydraulic motor, and means for selectively operably connecting and disconnecting said hydraulic motor with respect to said drive wheels, said steering means being power operated, said remote control system including valve means for controlling the operation of the power steering means, said means for selectively connecting and disconnecting said hydraulic motor with respect to said drive wheels comprises clutch means, a control member for selectively operating said clutch means, diversion valve means to enable said power steering means to be operated either by said first-mentioned steering means or the steering control means of the remote control system, said last-mentioned diversion valve means being operatively connected with said member for controlling the operation of said clutch means.

7. In combination, a vehicle for supporting power-operated machinery, said vehicle including dirigible wheels, steering means on the vehicle for steering said dirigible wheels, said vehicle also including drive wheels, drive means on the vehicle for driving said drive wheels, brake means for said drive wheels, means on the vehicle for operating said brake means, said vehicle including outrigger means, control means on the vehicle for said outrigger means, and a remote control system on the vehicle and including a source of hydraulic pressure, a hydraulic motor on said vehicle, means providing communication between said source of hydraulic pressure and said hydraulic motor, and means for selectively operably connecting and disconnecting said hydraulic motor with respect to said drive wheels, first diversion valve means for controlling the direction of flow of hydraulic pressure to said hydraulic motor, and second diversion valve means for selectively diverting the flow of hydraulic pressure from said hydraulic motor to said outrigger means so that the hydraulic motor or the outrigger means may be alternatively operated.

8. In combination, a vehicle for supporting power-operated machinery, said vehicle including dirigible wheels, steering means on the vehicle for steering said dirigible wheels, said vehicle also including drive wheels, drive means on the vehicle for driving said drive wheels, brake means for said drive wheels, means on the vehicle for operating said brake means, said vehicle including outrigger means, control means on the vehicle for said outrigger means, and a remote control system on the vehicle and including a source of hydraulic pressure, a hydraulic motor on said vehicle, means providing communication between said source of hydraulic pressure and said hydraulic motor, and means for selectively operably connecting and disconnecting said hydraulic motor with respect to said drive wheels, a turntable on said vehicle, swivel means extending through said turntable for providing hydraulic pressure and air pressure communication through said swivel means between opposite sides of the turntable, one end portion of said swivel means being connected with said source of hydraulic pressure, said remote control system including a source of air pressure, said one end of said swivel means being connected with said source of air pressure, said steering means including power-operating means, the lower portion of said swivel means being operatively connected with said power-operating means as well as with said hydraulic motor, said vehicle also including tandem brake means, the lower end of said swivel means being operatively connected with said tandem brake means, the lower end of said swivel means also being operatively connected with said outrigger means.

9. In combination, a vehicle for supporting power-operated machinery, said vehicle including dirigible wheels, steering means on the vehicle for steering said dirigible wheels, said vehicle also including drive wheels, drive means on the vehicle for driving said drive wheels, brake means for said drive wheels, means on the vehicle for operating said brake means, said vehicle including outrigger means, control means on the vehicle for said outrigger means, and a remote control system on the vehicle and including a source of hydraulic pressure, a hydraulic motor on said vehicle, means providing communication between said source of hydraulic pressure and said hydraulic motor, and means for selectively operably connecting and disconnecting said hydraulic motor with respect to said drive wheels, said steering means including power-operating means, said brake means including tandem brakes for said drive wheels, said remote control system including control means for said power-operated steering means, first diversion valve means for controlling the direction of flow of hydraulic pressure to said hydraulic motor, second diversion valve means for diverting the flow of hydraulic pressure from said hydraulic motor to said outrigger means so that the hydraulic motor and the outrigger means can be alternatively operated, said means for selectively connecting and disconnecting said hydraulic motor with said drive wheels comprising clutch means, a control member for controlling the operation of said clutch means, third diversion valve means for enabling the power-operated steering means to be operated by the control means of said remote control system or by the steering means on the vehicle, said member being operatively connected with said last-mentioned diversion valve means for controlling the operation thereof, a first air reservoir on said vehicle, a second air reservoir on said vehicle, said second air reservoir comprising a portion of said remote control system, said remote control system including an air compressor operatively connected with said second air reservoir said second air reservoir being operatively connected with said first air reservoir to maintain pressure in said first air reservoir, said second air reservoir also being operatively connected with said tandem brakes, and said remote control system including valve means for controlling the operation of said tandem brakes.

References Cited
UNITED STATES PATENTS

| | | | |
|---|---|---|---|
| 2,638,232 | 5/1953 | Perkins | 212—38 |
| 2,674,333 | 4/1954 | Zeilman | 212—38 |
| 2,728,463 | 12/1955 | Beckwith | 212—38 |
| 2,959,260 | 11/1960 | Johnson | 212—38 |
| 3,035,722 | 5/1962 | Anderson | 212—35 |
| 3,095,978 | 7/1963 | Boyer | 212—38 |
| 3,173,550 | 3/1965 | Province | 212—38 |
| 3,261,421 | 7/1966 | Forster | 180—66 |

EVON C. BLUNK, *Primary Examiner.*

U.S. Cl. X.R.

180—66; 212—145